United States Patent [19]

Snyder

US005308890A

[11] Patent Number: 5,308,890
[45] Date of Patent: May 3, 1994

[54] EMULSION POLYMER BLEND OF A MULTI-STAGE LATEX AND A NON-FILM FORMING LATEX

[75] Inventor: Barry S. Snyder, Dresher, Pa.

[73] Assignee: Rohm and Haas Company, Philadelphia, Pa.

[21] Appl. No.: 23,658

[22] Filed: Feb. 26, 1993

[51] Int. Cl.$^5$ .......................... C08J 3/03; C08L 51/06
[52] U.S. Cl. .................................. 523/201; 524/501; 524/504; 525/902
[58] Field of Search ................ 523/201; 524/501, 504; 525/902

[56] References Cited

U.S. PATENT DOCUMENTS 4,385,152 5/1983 Boyack et al. ...................... 525/902
4,567,099 1/1986 Van Gilder et al. ............... 523/201

FOREIGN PATENT DOCUMENTS 0466409 1/1992 European Pat. Off. .

Primary Examiner—Paul R. Michl
Assistant Examiner—Peter Szekely
Attorney, Agent, or Firm—James G. Vouros

[57] ABSTRACT

This invention relates to a blend of at least two emulsion polymers. In particular, the emulsion polymer blend comprises from 95 to 40 percent by weight of at least one first latex and from 5 to 60 percent by weight of at least one second latex, wherein the first latex is multi-stage comprising from 95 to 50 percent by weight of at least one soft stage polymer having a Tg less than 50° C. and from 5 to 50 percent by weight of at least one hard stage polymer having a Tg from about 20° C. to about 160° C., and wherein the second latex is not an ambient temperature film-forming polymer. The emulsion polymer blend of this invention can be used to formulate a variety of aqueous coating compositions, such as for example, paints, mastics, caulks, sealants, varnishes, floor polishes, and the like. The emulsion polymer blend of this invention is also useful for formulating an aqueous coating composition which is coalescent-free.

24 Claims, No Drawings

EMULSION POLYMER BLEND OF A MULTI-STAGE LATEX AND A NON-FILM FORMING LATEX

This invention relates to an emulsion polymer blend of at least two emulsion polymers, at least one of which is a multi-stage latex and at least one of which is a latex which does not form a film at ambient temperature. This emulsion polymer blend is useful for formulating aqueous coating compositions, such as, for example, paints, mastics, caulks, sealants, varnishes, clear coatings, paper coatings, textile coatings, floor polishes and the like. In general, the emulsion polymer blend acts as a binder in these aqueous coating compositions.

The glass transition temperature ("Tg") of a polymer is an inherent physical property of the monomer or monomers used to make the polymer. The Tg of a polymer determines the relative hardness or softness of the polymer. The higher the polymer's Tg, the harder the polymer, and the lower the polymer's Tg, the softer the polymer. The Tg of a polymer also determines the physical characteristics of a film formed from a coating composition containing the polymer, as well as the minimum temperature at which the coating composition containing the polymer can be applied to a substrate to form a film.

Increasing the Tg of a polymer useful as a binder in a coating will increase the hardness of the final coating. The hardness of a coating is important because it affects other desirable properties of the coating such as block resistance, print resistance, dirt pick-up resistance, tack-free ability, and mar resistance.

"Block resistance," as used herein, refers to the resistance of coated surfaces to stick together when stacked or placed in contact with each other under pressure. Painted surfaces often come in contact with each other in, for example, window and door areas, and sometimes stick together, which is undesirable. Block resistance is improved by increasing the hardness of the coating.

"Print resistance," as used herein, refers to the ability of a coating to resist imprinting by the force due to contact with another surface. Substrates painted with interior semigloss and gloss paints often come into contact with other objects, such as, for example, flower pots on window sills. This can cause a permanent impression in the paint film due to the pressure exerted by the object. This tendency for a paint film to "print" is undesirable. Print resistance is improved by increasing the hardness of the coating.

"Dirt pick-up resistance," as used herein, refers to the ability of a coated surface to resist the deposit of foreign matter consisting of dirt, soot, or stain onto a coated substrate. The deposit of foreign matter onto a coated substrate is aesthetically undesirable and the deposited material may be difficult to remove from the coated substrate. Generally, the harder the coating, the more resistant is the coating to dirt pick-up.

"Tack-free ability," as used herein, refers to the freedom from stickiness of a coating after a suitable drying time. Generally, the harder the coating, the less tacky it is.

"Mar resistance," as used herein, refers to the ability of a coating to resist damaged caused by light abrasion, impact or pressure. It is desirable for a coating such as for example, a furniture coating, to have mar resistance.

Although an aqueous coating can be formulated with a polymer that gives the desired balance of hardness properties, it can lack adequate film formation properties; this may result in a coating which is brittle or inflexible. Adequate film formation is indicated by the formation of a continuous coating free from defects such as, for example, cracks and flakes. "Brittleness" as used herein, refers to the tendency of a coating to crack or snap when subjected to a deformation, such as, for example, movement or temperature change. It is not desirable for a coating to have brittleness. It is desirable for a coating to have flexibility. By "flexibility," it is meant the degree to which a coating, after drying, is able to conform to movement or deformation of its supporting surface, without cracking or flaking. The need for flexibility is demonstrated by coatings which are subjected to stress by substrates which expand or contract when exposed to changes in weather, such as, for example, bridges, building shingles, and the like.

As the Tg of the polymer used as the binder in the aqueous coating is increased, the hardness of the coating is increased, and the minimum temperature required for the coating to form a film, herein after referred to as the "Minimum Film Formation Temperature" or "MFT" is also increased. If the polymer is selected for its ability to contribute hardness to the coating, but the coating will not form a film at the temperatures at which it is to be applied, the coating formulation is not useful. Therefore, it is necessary to add a coalescent to the coating formulation. A coalescent is an organic solvent that lowers the MFT of the polymer, thereby permitting the coating to form a useful film at a temperature below the Tg of the polymer. Coalescents are typically employed at concentrations of from about 3 to about 80 percent by weight based on the weight of the polymeric binder solids.

The use of coalescents has proven to be a very useful way to solve the problem of obtaining certain desired film properties with high Tg polymers, which do not readily form films at desired application temperatures; however, this solution has created another problem. During the drying of a coalescent containing formulation, the organic solvents evaporate and enter into the atmosphere. In addition to the unpleasant odor associated with these organic solvents, there is growing concern about the potentially adverse environmental and health effects of many of these organic solvents.

There is a need for an emulsion polymer for aqueous coatings which provides desirable hardness properties, adequate film formation under ambient conditions, and flexibility. In addition, it is also desirable to reduce or eliminate the amount of organic solvents in an aqueous coating without compromising physical properties or film formation.

The use of bimodal latexes for paper coatings is disclosed in U.S. Pat. No. 4,567,099. These bimodal latexes have two separate and distinct particle size distributions. The larger polymer particles of the bimodal latex are heterogeneous in nature and have a soft polymer domain and a hard polymer domain. The '099 patent teaches the use of bimodal latexes for increasing the solids in a paper coating and obtaining desirable rheology of the coating. The '099 patent does not disclose the use of bimodal latexes for obtaining desirable hardness and flexibility properties in an aqueous coating.

Blends of hard and soft emulsion polymers are known in the art. EP 466,409 A1 discloses a system which contains a mixture of a hard latex with Tg greater than 20° C., and a soft latex with a Tg less than 15° C. The blend system described in EP 466,409 A1 is disclosed to result in films with adequate film formation and hardness without the use of a coalescent.

According to a first aspect of the present invention, there is provided an emulsion polymer blend comprising from about 95 to about 40 percent by weight of at least one first latex and from about 5 to about 60 percent by weight of at least one second latex, wherein the first latex is multi-stage comprising from about 95 to about 50 percent by weight of at least one soft stage polymer having a Tg less than 50° C. and from about 5 to about 50 percent by weight of at least one hard stage polymer having a Tg from about 20° C. to about 160° C., wherein the Tg of the soft stage polymer is lower than the Tg of the hard stage polymer, and wherein the second latex does not form a film at ambient temperature.

A second aspect of the invention is an aqueous coating composition comprising from about 30 to 100 percent by volume of these emulsion polymer blends.

The emulsion polymer blend of this invention is particularly advantageous for use in aqueous coating compositions. An important advantage that the emulsion polymer blend provides is that it permits the formulation of aqueous coatings having adequate film formation, and a desirable balance of flexibility, block resistance, print resistance, and hardness properties. A comparable balance of these properties cannot be obtained by the use of other types of systems, such as, for example, a random copolymer, simple blends of conventional emulsion polymers, a single type of multi-stage polymer, and the like. A further advantage of the emulsion polymer blends of this invention is that they can be used to formulate aqueous coatings with a desirable balance of hardness properties and adequate film formation, which require no or reduced levels of organic solvents.

The emulsion polymer blends of this invention contain at least two latexes. The first latex in the blend is multi-stage, made by a multi-stage process. By "multi-stage process," it is meant that the latex is prepared by the sequential polymerization of two or more distinct monomer mixtures. Such latexes may exhibit one of the following morphological configurations: core/shell, core/shell particles with a multiplicity of cores, and the like. By core/shell it is meant that the polymer prepared in at least one of the stages, the core, is encapsulated within the polymer prepared in at least one other stage, the shell.

The second latex that is present in the blend does not form a film at ambient temperature. By this it is meant that this latex only forms films at temperatures greater than ambient. The second latex may be prepared by conventional emulsion polymerization techniques provided that the Tg is from about 20° C. to about 160° C., and more preferably that the Tg is from about 40° C. to about 100° C. In addition, it is required that the weight average molecular weight of the second latex, $M_w$, be from about 5000 to several million, preferably greater than 10,000, and most preferably greater than 50,000. It is known in the art that there is a tradeoff between polymer molecular weight and properties, with higher molecular weight providing improved toughness, and lower molecular weight providing improved polymer mobility. Thus, the choice of molecular weight will be dependent upon the particular use and property desired. The second latex may also be prepared by a multi-stage process.

The emulsion polymer blends are prepared by combination of at least one multi-stage latex and at least one second latex. The absolute particle sizes of the latexes are dictated by the requirements of the use and properties, such as for example, gloss, levelling, rheology, opacity, and the like. The only preference is that the first latex has the same particle size or larger particle size than the second latex. It is preferrable that the relative particle size ratio of the first to the second latex may be from about 1:1 to about 20:1. It is even more preferrable that the relative particle size ratio be about 2:1 to about 10:1. The upper particle size ratio of these ranges will be limited only by the synthetic constraints on making stable large particle size latexes, such as for example, larger than 600 nanometers.

The emulsion polymer blend of this invention comprises from about 95 to 40 percent by weight of the first latex and from about 5 to 60 percent by weight of the second latex. However, the amount of the first and second latexes in the emulsion polymer blend depends on the particle size ratio of the first to the second latex. For example, for blends in which the particle size ratio of the first to the second latex is 1:1, it is preferred that the blend contain from about 80 to 50 percent by weight of the first latex and from about 20 to 50 percent by weight of the second latex. For blends in which the particle size ratio of the first latex to the second latex is 2:1 or greater, it is preferred that the blend contain from about 90 to 60 percent by weight of the first latex and from about 10 to 40 percent by weight of the second latex, and more preferably from 85 to 70 percent of the first latex and from 15 to 30 percent of the second latex.

The first latex in the emulsion polymer blend, the multi-stage latex, comprises from about 95 to 50 percent by weight of at least one soft stage polymer having a Tg less than 50° C., and from about 5 to 50 percent by weight of at least one hard stage polymer having a Tg from about 20° C. to about 160° C., preferably from about 40° C. to about 100° C. It is required that the Tg of the soft stage be lower than the Tg of the hard stage. In addition, it is required that the weight average molecular weight of the hard stage polymer, $M_w$, be from about 5000 to several million, preferably greater than 10,000, and most preferably greater than 50,000. The first latex is useful in the emulsion polymer blend of this invention regardless of the order in which the stages are polymerized.

When coalescent is used in conjunction with the emulsion polymer blend of this invention, the ranges of Tg and relative percent of stages of the first latex determines the amount of coalescent necessary in the blend to achieve adequate ambient temperature film formation. For certain uses it is desirable to provide even greater hardness, such as furniture coatings, floor polishes, appliance coatings, and the like; this may be achieved by incorporating lower levels of the soft stage and raising the Tg's of the soft and hard stages.

In order to eliminate the need for coalescent in the coating formulation, it is necessary that the first latex comprises from about 95 to 55 percent by weight of the soft stage polymer having a Tg less than about 20° C. and from about 5 to 45 percent by weight of the hard stage polymer having a Tg greater than about 20° C., and preferably, from 75 to 60 percent by weight of the soft stage polymer having a Tg less than 10° C. and from 25 to 40 percent of the hard stage polymer having a Tg greater than 20° C. A coating which does not require the addition of coalescent may be formulated using only the multi-stage latex. Addition of the second latex to this formulation does not compromise the film forming properties of the formulation, and does not require that coalescent be added, provided that the amount of the second latex in the blend is within the ranges set forth in this invention. Furthermore, the addition of the second latex to the multi-stage latex increases the hardness, block resistance, and print resistance of the coating relative to that which could be obtained by formulating a coating with only the multi-stage latex.

The emulsion polymer blends of this invention may be formulated with coalescent to achieve adequate ambient temperature film formation in uses where extreme hardness is required. In order to achieve film formation of these systems, very high levels of coalescent may be required, such as 80 percent or greater, by weight, on polymer solids. A coating formulated with the first latex in the absence of the second latex may require the addition of coalescent to form a film, depending upon the Tg's and weight percent of the respective soft and hard stages. Addition of the second latex to this formulation does not compromise the film forming properties of the coating, and does not require that additional coalescent be added, provided that the amount of the second latex in the blend is within the ranges set forth in this invention. The addition of the second latex to the multi-stage latex increases the hardness, block resistance, and print resistance of the coating relative to that which could be obtained by formulating a coating with only the multi-stage latex. A coating formulated with the emulsion polymer blend contains a lower weight fraction, based upon polymer solids, of coalescent than a coating formulated with only the multi-stage latex. This is illustrated as follows: a coating formulated with only the multi-stage latex requiring 20% coalescent, based upon polymer solids, would require 14% coalescent, based upon polymer solids, in the presence of 30% of the second latex.

Both the multi-stage latex and the second latex in the emulsion polymer blends of this invention may be prepared by standard emulsion polymerization techniques well known in the art.

The multi-stage latex is prepared by the addition polymerization of at least one ethylenically-unsaturated monomer in each stage of the multi-stage process. Similar monomers may be used in the preparation of the second latex. For example, acrylic ester monomers including methyl acrylate, ethyl acrylate, butyl acrylate, 2-ethylhexyl acrylate, decyl acrylate, methyl methacrylate, butyl methacrylate, i-butyl methacrylate, i-bornyl methacrylate, hydroxyethyl acrylate, hydroxyethyl methacrylate, hydroxypropyl methacrylate, phosphoethyl methacrylate, acetoacetoxyethyl methacrylate, N,N dimethylaminoethyl methacrylate, and t-butylaminoethyl methacrylate; acrylamide or substituted acrylamides; styrene or substituted styrenes; butadiene; vinyl acetate or other vinyl esters; vinyl ethers; acrylonitrile or methacrylonitrile; and the like, may be used. Low levels of ethylenically-unsaturated carboxylic acids such as, for example, methacrylic acid, acrylic acid, itaconic acid, maleic acid, fumaric acid, and the like, at a level of 0–10 percent by weight based on the weight of the polymer, may be used. In addition, the polymers may contain monomers known to increase the adhesion of the polymer to substrate surfaces, also known as adhesion promoters. The particular choice and amount of monomers is dictated by the requirements of the use and desired properties.

Both latexes in the emulsion polymer blends of this invention may include crosslinking monomers, such as for example, allyl methacrylate, divinyl benzene, multifunctional acrylates including diethylene glycol dimethacrylate, trimethylol propane trimethacrylate, and the like. The hard stage of the multi-stage latex may be crosslinked. The soft stage of the multi-stage latex may also be crosslinked; however, the amount of crosslinking monomer that can be incorporated into the soft stage is limited by the need for adequate film formation, even in the presence of a coalescent.

The monomers may be emulsified with an anionic, cationic, or nonionic surfactant or dispersing agent, or compatible mixtures thereof such as a mixture of an anionic and a nonionic surfactant, using, for example, from about 0.05% to about 5% by weight of a surfactant or dispersing agent based on the weight of the monomer. Suitable cationic dispersion agents include lauryl pyridinium chloride, cetyldimethyl amine acetate, and alkyldimethylbenzylammonium chloride, in which the alkyl group has from 8 to 18 carbon atoms. Suitable anionic dispersing agents include, for example, alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium octylphenoxypolyethoxyethyl sulfate, having 1 to 5 oxyethylene units, and the like. Suitable non-ionic dispersing agents include, for example, alkyl phenoxypolyethoxy ethanols having alkyl groups of from about 7 to 18 carbon atoms and from about 6 to about 60 oxyethylene units such as, for example, heptyl phenoxypolyethoxyethanols; ethylene oxide derivatives of long chained carboxylic acids such as lauric acid, myristic acid, palmitic acid, oleic acid, and the like, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers such as hydroxyethyl cellulose, methyl cellulose, polyacrylic acid, polyvinyl alcohol, and the like, may be used as emulsion stabilizers and protective colloids.

Initiation of the emulsion polymerization may be carried out by the thermal decomposition of free radical precursors which are capable of generating radicals suitable for initiating addition polymerization such as, for example, ammonium or potassium persulfate. Or, such free radical precursors may be used as the oxidizing component of a redox system, which also includes a reducing component such as potassium metabisulfite, sodium thiosulfate, or sodium formaldehyde sulfoxylate. The free radical precursor and reducing agent together, referred to as a redox system herein, may be used at a level of from about 0.01% to 5%, based on the weight of monomers used. Examples of redox systems include t-butyl hydroperoxide/sodium formaldehyde sulfoxylate/Fe(lll) and ammonium persulfate/sodium bisulfite/sodium hydrosulfite/Fe(lll). The polymerization temperature may be from about 20° C. to about 95° C.

The first stage of the multi-stage process, as well as the process for preparing the second latex may be seeded, i.e., initiated in the presence of a small particle size preformed emulsion polymer, or unseeded. Seeded polymerization is preferred and tends to yield aqueous dispersions of latex polymer having more uniform particle size than unseeded polymerization.

Chain transfer agents including mercaptans, polymercaptans, alcohols, and halogen compounds are sometimes used in the polymerization mixture in order to moderate the molecular weight of the polymeric binder. Generally, from 0% to about 3% by weight, based on the weight of the polymeric binder, of $C_4$-$C_{20}$ alkyl mercaptans, mercaptopropionic acid, or esters of mercaptopropionic acid, may be used.

Each stage of the multi-stage process, and the process for preparing the second latex, may incorporate thermal or redox initiation of polymerization. A monomer emulsion containing all or some portion of the monomers to be polymerized in a given stage of the first latex, or in the preparation of the second latex, may be prepared using the monomers, water, and emulsifiers. A solution of initiator in water may be separately prepared. The monomer emulsion and initiator solution may be co-fed into the polymerization vessel over the course of the emulsion polymerization of any stage of the process of preparing the first latex, or during the preparation of the second latex. The reaction vessel itself may also initially contain seed emulsion and further may additionally contain an initial charge of polymerization initiator. The temperature of the contents of the reaction vessel may be controlled by cooling to remove heat generated by the polymerization reaction or by heating the reaction vessel. Several monomer emulsions may be simultaneously co-fed into the reaction vessel. When multiple monomer emulsions are co-fed, they may be of different monomer composition. The sequence and rates at which the monomer emulsions are co-fed may be altered during the emulsion polymerization process. After addition of the first stage monomer emulsion or emulsions has been completed, the polymerization reaction mixture may be held at some temperature for a time and/or treated with a polymerization inhibitor prior to polymerization of the second, or subsequent stages. Similarly, after addition of the final stage monomer emulsion or emulsions has been completed, or the completion of the preparation of the second latex, the polymerization reaction mixture may be held at some temperature for a time and/or treated with a polymerization inhibitor before cooling to ambient temperature. A multi-stage process which is a two-stage process is preferred.

Adjuvants useful in the preparation of the multi-stage latex, or the second latex, and/or in its subsequent use and which may be added during or subsequent to the polymerization reaction may include auxiliary surfactants; defoamers such as, for example, SURFYNOL® 104E surfactant (SURFYNOL is a registered trademark of Air Products & Chemicals, Inc.) and Nopco® NXZ defoamer (Nopco is a registered trademark of Henkel Corp.), used at a level from about 0.001 to about 0.1%, by weight based on the weight of the monomer mixture; levelling agents such as, for example, Sag® Silicone Antifoam 471 levelling agent (Sag is a registered trademark of Union Carbide Corp.), used at a level from about 0.001 to about 0.1%, by weight based on the weight of the monomer mixture; antioxidants used at a level from about 0.1 to about 5%, by weight based on the weight of the monomer mixture; plasticizers such as, for example, dibutyl pthalate; and preservatives such as, for example, KATHON® biocide (Kathon is a registered trademark of Rohm and Haas Co.) used at a level of 5-250 ppm.

The emulsion polymer blends of this invention can be used to formulate a variety of types of coatings including: latex paints for architectural uses and industrial uses, such as bridge or other structural coatings, appliance finishes and office furniture coatings; mastics for coating the roof and exterior of buildings; caulks and sealants; varnishes, and other clear coatings for wood; inks; paper coatings; coatings for fabric and non-woven fibers; leather coatings; floor polishes or sealers for floor coverings; concrete sealers; and the like.

In general, the coatings formulated with the emulsion polymer blends of this invention may include from 30 to 100 percent by volume of these blends. Additional ingredients in the formulation may also include: pigments, extenders, dispersants, surfactants, coalescents, wetting agents, thickeners, rheology modifiers, plasticizers, biocides, defoamers, colorants, waxes, slip and mar aids, and the like.

The coatings of this invention may be applied to a wide variety of substrates, such as, for example, wood, paper, fiber, metal, glass, ceramics, plaster, stucco, asphalt, gypsum board, plastics, leather, concrete, and the like.

Coatings formulated with the emulsion polymer blend may be baked to further improve the hardness and flexibility. This is desirable because certain uses require very high hardness, as indicated by a Tukon hardness above 5.0 Knoops Hardness Number, and extreme flexibility as indicated by a reverse impact resistance greater than 50 inches/pound. The baking temperature that is required to improve hardness and flexibility must be greater than the hard stage Tg and the Tg of the second latex. The temperature required for baking decreases as the molecular weight, $M_w$, of the hard stage and the molecular weight, $M_w$, of the second latex decrease.

Test Methods

Unpigmented test samples were prepared by applying the latex to anodized aluminum panels of the appropriate wet thickness to yield a 1.5 mil dry film. Films were dried under ambient conditions and aged for 24 hours at 75° F. and 50 percent relative humidity. Pigmented samples were similarly applied to vinyl sheet and sealed paper charts. Coalesced samples were subject to the above aging process following an 8 hour force dry at 50° C.

Block resistance for unpigmented samples was measured by a modification of ASTM D4946-89, and is a measure of the resistance of a film to auto-adhesion. It is based upon the ability of the polymer film surface to withstand face-to-face contact with another film surface under a predetermined load, at a fixed temperature, for a fixed amount of time. The test is conducted by assembling two 1.5 inch by 1.5 inch test samples with the two film surfaces in contact, applying a load of 1 pound per square inch to the assembly and then heating the assembly at 140° F. for 1 hour. After baking, the assembly is removed from the oven, the load released, and the cooled test samples separated. The degree of film damage and adhesion are assessed and rated 0 through 10, with the former indicating complete film degradation, and the latter indicating no damage and no adhesion. Paint samples were similarly tested, but were baked at 120° F. for 30 minutes prior to assessment.

Print resistance for unpigmented samples was measured by a modification of ASTM D2091-88, and is a measure of the resistance of a film to compressive deformation. It is based upon the ability of the polymer film to withstand contact with an imprinting object under a predetermined load, at a fixed temperature for a fixed amount of time. The test is conducted by applying to a 1.5 inch by 1.5 inch test sample a similar sized piece of 4-ply cheesecloth, subjecting the assembly to a 1 pound per square inch load, and then heating the assembly at 140° F. for 4 hours. After heating, the assembly is removed from the oven, the load released, and the cheesecloth removed from the cooled test sample. The degree of film damage is assessed and rated 0 through 10, with the former indicating complete defacement, and the latter indicating no film damage. Paints were similarly tested, but were heated at 120° F. for 4 hours prior to assessment.

Knoop hardness was determined in accord with the ASTM test method D1474-68. Mandrel flexibility was measured in accord with the ASTM test method D1737-62, with the exception that samples were cast on anodized aluminum. The reported values represent the smallest mandrel size around which the film did not fail. Thus, lower numbers indicate greater flexibility. Reverse impact resistance was measured by a modification of the ASTM test method G14-88. The tup was allowed to fall from a known height onto the back of a coated aluminum panel. The maximum force which the coating is capable of withstanding without visible damage under these conditions is reported as the reverse impact resistance in inches/pound. The magnitude of the reverse impact resistance provides a measure of the toughness and flexibility of a film. Thus, higher numbers indicate greater toughness and flexibility.

The following examples are presented to illustrate the invention. They are not intended to limit the invention as other uses of the invention will be obvious to those of ordinary skill in the art.

EXAMPLE 1

Preparation of Latexes in the Emulsion Polymer Blends
Preparation of Single Stage Latexes (Conventional Emulsion Polymerization)

Samples 1 through 8 were prepared by a standard semi-continuous technique utilizing recipes as set out in Table 1, and an 85° C. polymerization temperature. Particle sizes were measured by light scattering using a Brookhaven BI-90; glass transition temperatures were calculated from the Fox equation (1/Tg[copolymer] = 1/Tg[monomer A] + 1/Tg[monomer B] + 1/Tg[monomer n], etc.), or measured by differential scanning calorimetry (DSC), and reported as the midpoint of the transition.

Sample 1 was prepared as follows: A three liter, stirred reaction vessel was initially charged with 990 grams (g) of deionized water (DI water) and 7.48 g of anionic surfactant, placed under a nitrogen atmosphere, and heated to 85° C. A monomer emulsion (ME) was prepared by dispersing the combined monomers in 225 g of DI water with 0.75 g of anionic surfactant. To the reactor was added the sodium carbonate dissolved in 25 g of DI water, 50 g of ME and the ammonium persulfate dissolved in 40 g of DI water. The remaining ME was added, over a period of 2.5 hours to the reaction vessel, after which the temperature was maintained at 80° to 85° C. for an additional 30 minutes. The cooled emulsion polymer was filtered through cheesecloth and subsequently treated with 28 percent aqueous ammonia to raise the pH to 8 to 8.5.

Samples 2–8 were prepared using the same process for preparing sample 1, with the exception of the changes in the ingredients noted in table 1.

TABLE 1

| Ingredients (grams) | Single Stage Latexes Sample Number | | | | | | | |
|---|---|---|---|---|---|---|---|---|
| | 1 | 2 | 3 | 4 | 5 | 6 | 7 | 8 |
| Monomer Emulsion and Reactor Charge | | | | | | | | |
| Deionized water | 1434 | 1007 | 1725 | 1725 | 1725 | 1978 | 1813 | 1434 |
| Anionic surfactant | 8.2 | 8.0 | 8.2 | 8.2 | 8.2 | 3.4 | 1.7 | 8.2 |
| Butyl acrylate | 112.5 | 75 | 112.5 | 112.5 | 112.5 | 1156 | 1156 | |
| Ethyl acrylate | | | | | | | | 75 |
| Methyl methacrylate | 592.5 | 395 | 592.5 | 592.5 | 592.5 | 527 | 527 | 671.3 |
| Methacrylic acid | 7.5 | 5.0 | 7.5 | 7.5 | 7.5 | 17 | 17 | 3.87 |
| Mercaptan | | | | 1.5 | 6.0 | | | |
| Other ingredients | | | | | | | | |
| Ammonium persulfate | 1.1 | 1.9 | 1.1 | 1.1 | 1.1 | 4.2 | 4.2 | 1.1 |
| Sodium carbonate | 0.2 | | 0.2 | 0.2 | 0.2 | 2.4 | 2.4 | 2.5 |
| Characterization | | | | | | | | |
| Particle Size (nm) | 69 | 31 | 51 | 55 | 44 | 141 | 374 | 65 |
| Total Solids (%) | 34.6 | 32.1 | 33.2 | 30.5 | 30.5 | 46.0 | 48.5 | 38.0 |
| Tg (°C.) | 70 | 70 | 89* | 86* | 81* | −20 | −20 | 87 |

*Measured by DSC.

Preparation of Two-Stage Latexes

A two stage semi-continuous emulsion polymerization technique was utilized for the preparation of samples 9–16, using the recipes set out in Table 2. Samples 9–16 are examples of two-stage latexes prepared by initial polymerization of a soft, low Tg, stage, followed by the polymerization of a hard, high Tg, stage.

Sample 9 was prepared as follows: A 5 liter, stirred reaction vessel was initially charged with 733 g of DI water and 0.81 g of anionic surfactant, placed under a nitrogen atmosphere, and heated to 85° C. The soft stage monomer emulsion (ME1) was prepared by dispersing the combined soft stage monomers in 297 g of DI water with 1.01 g of anionic surfactant. 1.42 g sodium carbonate and 65 g of ME1 were subsequently added to the reactor. The remaining ME1 was added, along with a cofeed of 1.25 g of ammonium persulfate dissolved in 90 g DI water, over a period of 3.5 hours, to the reaction vessel. Upon completion of the feed the temperature was maintained at 80° to 85° C. for an additional 30 minutes. An additional 0.42 g of ammonium persulfate was added to the reactor. This was followed by a 3.5 hour addition of the hard stage monomer emulsion (ME2), which was prepared by dispersing the combined hard stage monomers in 85 g of DI water with 0.34 g of anionic surfactant; a cofeed of 0.42 g of ammonium persulfate dissolved in 150 g of DI water was also added over this period. After completion of all feeds the resultant emulsion polymer was maintained at 80° to 85° C. for an additional 30 minutes. The cooled emulsion polymer was filtered through cheesecloth, and subsequently treated with 28 percent aqueous ammonia to raise the pH to 8 to 8.5.

Samples 10–16 were prepared using the same process for preparing sample 9, with the exception of the changes in the ingredients noted in Table 2.

TABLE 2

| Ingredient (grams) | Two Stage Latexes Sample Number | | | | | | | |
|---|---|---|---|---|---|---|---|---|
| | 9 | 10 | 11 | 12 | 13 | 14 | 15 | 16 |
| Monomer Emulsion One (Soft Stage) and Reactor Charge | | | | | | | | |
| Deionized water | 1012 | 905 | 810 | 1023 | 1023 | 1360 | 907 | 1088 |
| Anionic surfactant | 1.82 | 1.63 | 1.46 | 1.63 | 1.63 | 1.28 | 0.85 | 1.03 |
| Butyl acrylate | 684 | 611 | 548 | 611 | 611 | 867 | 578 | 694 |
| Methyl methacrylate | 312 | 279 | 250 | 279 | 279 | 395 | 264 | 316 |
| Methacrylic acid | 10 | 9 | 8 | 9 | 9 | 13 | 8.5 | 10 |
| Monomer Emulsion Two (Hard Stage) | | | | | | | | |
| Deionized water | 639 | 752 | 860 | 621 | 621 | 453 | 907 | 725 |
| Anionic surfactant | 0.34 | 0.45 | 0.54 | 0.45 | 0.45 | 0.43 | 0.85 | 0.68 |
| Butyl acrylate | 51 | 67 | 81 | 67 | 67 | 64 | 127.5 | 102 |
| Methyl methacrylate | 270 | 357 | 432 | 357 | 357 | 340 | 680 | 544 |
| Styrene | 17 | 22 | 27 | 22 | 22 | 21 | 42.5 | 34 |
| Mercaptan | | | | 0.89 | 3.6 | | | |
| Other Ingredients | | | | | | | | |
| Ammonium persulfate | 3.3 | 3.3 | 3.3 | 3.3 | 3.3 | 4.2 | 4.2 | 4.2 |
| Sodium carbonate | 1.4 | 1.4 | 1.4 | 1.4 | 1.4 | 2.4 | 2.4 | 2.4 |
| Characterization | | | | | | | | |
| Percent Hard | 25 | 33 | 40 | 33 | 33 | 25 | 50 | 40 |
| Percent Soft | 75 | 67 | 60 | 67 | 67 | 75 | 50 | 60 |
| Particle Size (nm) | 133 | 138 | 143 | 140 | 142 | 363 | 362 | 357 |
| Total Solids (%) | 45.0 | 45.0 | 44.7 | 44.6 | 44.7 | 48.2 | 49.4 | 48.7 |
| Tg (Soft Stage, °C.) | −21 | −21 | −21 | −21 | −21 | −21 | −21 | −21 |
| Tg (Hard Stage, °C.) | 67 | 67 | 67 | 67 | 67 | 67 | 67 | 67 |

Samples 17–19 were prepared using the same process as for sample 9. Samples 17–19 are examples of two-stage emulsion latexes in which the glass transition temperature of the soft stage is raised, as outlined in Table 3. Sample 20 was prepared using the same process as sample 9. Sample 20 is an example of a latex prepared by a two stage process which involves initial polymerization of the hard, crosslinked stage, followed by polymerization of the soft stage.

Polymer compositions, with relative weight fractions, for Samples 1–20 are summarized in Table 4.

TABLE 3

| Ingredients (grams) | Two Stage Latexes Sample Number | | | |
|---|---|---|---|---|
| | 17 | 18 | 19 | 20 |
| Monomer Emulsion One (Soft Stage 17–19, Hard Stage 20) and Reactor Charge | | | | |
| Deionized water | 1083 | 1083 | 1083 | 202 |
| Anionic surfactant | 1.03 | 1.03 | 1.03 | 0.48 |
| Butyl acrylate | 684 | 611 | 548 | 19 |
| Methyl methacrylate | 312 | 279 | 250 | 97 |
| Styrene | | | | 6 |
| Methacrylic acid | 10 | 9 | 8 | 2.5 |
| Allyl methacrylate | | | | 0.63 |
| Monomer Emulsion Two (Hard Stage 17–19, Soft Stage 20) | | | | |
| Deionized water | 722 | 722 | 722 | 606 |
| Anionic surfactant | 0.68 | 0.68 | 0.68 | 0.16 |
| Butyl acrylate | 51 | 67 | 81 | 218 |

TABLE 3-continued

| Ingredients (grams) | Two Stage Latexes Sample Number | | | |
|---|---|---|---|---|
| | 17 | 18 | 19 | 20 |
| Methyl methacrylate | 270 | 357 | 432 | 150 |
| Methacrylic acid | | | | 8 |
| Other Ingredients | | | | |
| Ammonium persulfate | 4.2 | 4.2 | 4.2 | 1.2 |
| Sodium carbonate | 2.4 | 2.4 | 2.4 | 0.7 |
| Characterization | | | | |
| Percent Hard | 40 | 40 | 40 | 25 |
| Percent Soft | 60 | 60 | 60 | 75 |
| Particle Size (nm) | 338 | 357 | 342 | 349 |
| Total Solids (%) | 48.4 | 48.1 | 48.2 | 37.0 |
| Tg (Soft Stage) °C. | −11 | 3 | 18 | 66 |
| Tg (Hard Stage) °C. | 67 | 67 | 67 | 10 |

TABLE 4

Polymer Composition of Samples 1–20

| Sample Number | Polymer Composition (Relative Weight Percent) |
|---|---|
| 1 | 15 BA/79 MMA/1 MAA |
| 2 | 15 BA/79 MMA/1 MAA |
| 3 | 15 BA/79 MMA/1 MAA |
| 4 | 15 BA/79 MMA/1 MAA |
| 5 | 15 BA/79 MMA/1 MAA |
| 6 | 68 BA/31 MMA/1 MAA |
| 7 | 68 BA/31 MMA/1 MAA |
| 8 | 10 EA/89.5 MMA/0.5 MAA |
| 9 | 75(68 BA/31 MMA/1 MAA)/25(15 BA/80 MMA/5 Sty) |
| 10 | 67(68 BA/31 MMA/1 MAA)/33(15 BA/80 MMA/5 Sty) |
| 11 | 60(68 BA/31 MMA/1 MAA)/40(15 BA/80 MMA/5 Sty) |
| 12 | 67(68 BA/31 MMA/1 MAA)/33(15 BA/80 MMA/5 Sty) |
| 13 | 67(68 BA/31 MMA/1 MAA)/33(15 BA/80 MMA/5 Sty) |
| 14 | 75(68 BA/31 MMA/1 MAA)/25(15 BA/80 MMA/5 Sty) |
| 15 | 50(68 BA/31 MMA/1 MAA)/50(15 BA/80 MMA/5 Sty) |
| 16 | 60(68 BA/31 MMA/1 MAA)/40(15 BA/80 MMA/5 Sty) |
| 17 | 60(60 BA/39 MMA/1 MAA)/40(15 BA/80 MMA/5 Sty) |
| 18 | 60(50 BA/49 MMA/1 MAA)/40(15 BA/80 MMA/5 Sty) |
| 19 | 60(40 BA/59 MMA/1 MAA)/40(15 BA/80 MMA/5 Sty) |
| 20 | 75(58 BA/40 MMA/2 MAA)/25(15 BA/77.5 MMA/5 Sty/0.5 ALMA) |

Note:
BA = butyl acrylate; MMA = methyl acrylate; Sty = styrene; EA = ethyl acrylate; MAA = methacrylic acid; ALMA = allyl methacrylate

EXAMPLE 2

Properties of films derived from coalescent free emulsion polymer blends, which include a 360 nanometer, two-stage latex blended with a second latex, at a particle size ratio of approximately 5:1.

Blends of samples 7, 14 and 16 with sample 8 were prepared at blend weight ratios of 100/0, 90/10, 80/20, 70/30 and 60/40. Sample 8 was the second latex in the blend and was single stage. Films were cast from each of the resultant emulsion polymer blends, and subjected to block, print and impact resistance tests, and the determination of film hardness, film formation, and flexibility. Results are shown in Table 5.

Inadequate film formation is evidenced by the formation of microscopic or macroscopic cracks during the film formation process. Further evidence of poor film formation comes from extreme brittleness in the film. With the exception of three films in the blend series containing 70/30, 65/35 and 60/40 blend ratios of samples 16 and 8, all films had satisfactory ambient temperature film formation, a crucial property for coalescent free filming systems. This example shows that it is possible to blend a two-stage latex with a harder, single stage latex and obtain adequate ambient temperature film formation.

For each series of blends, increasing concentrations of the second latex increased block and print resistance, and hardness of the films. However, the improvements in these properties obtained for blends containing samples 14 and 16 (both two-stage latexes) were superior to the properties that could be achieved by blending two single stage latexes (Blends of samples 7 and 8).

Samples 7, 14 and 16 were prepared with compositionally identical soft and hard stages, but differed in the relative quantities of hard stage from 0% to 40% of the total polymer weight. For example, Sample 7 is a single stage latex with 0% hard stage. Sample 14 is a two-stage latex which contains 25% hard stage and Sample 16 is a two-stage latex which contains 40% hard stage. Increasing the amount of hard stage within the two-stage latex improved the response to the blending process of properties which are hardness dependent, such as block and print resistance and measured hardness. For example, a comparison of block resistance for blends made at a 75/25 polymer blend ratio showed an improvement from 5 to 6 to 10 in response to increases in the amount of hard stage in the two stage latex. Similar improvements in print resistance, from 3 to 5 to 9, and in hardness, from 0.8 to 1.1 to 2.5, are also observed for the 75/25 blends. In addition, these films retained significant toughness and flexibility over a broad compositional range.

The example showed that a two-stage latex blended with a smaller particle size, second latex gave a combination of superior resistance properties, as evidenced by block and print resistance, coupled with improved hardness and with retention of adequate coalescent-free ambient film formation.

TABLE 5

| Blend Ratio | Block | Print | Reverse Impact (Inches/Pound) | Hardness (KHN) | Flexibility |
|---|---|---|---|---|---|
| Sample 7/Sample 8-Blends of Two Single Stage Latexes (Comparative Data) | | | | | |
| 100/0 | 0 | 0 | >55 | — | <1/8" |
| 95/5 | 0 | 0 | >55 | — | <1/8" |
| 90/10 | 4 | 0 | >55 | 0.8 | <1/8" |
| 85/15 | 4 | 0 | >55 | 0.6 | <1/8" |
| 80/20 | 4 | 1 | >55 | 0.5 | <1/8" |
| 75/25 | 5 | 3 | >55 | 0.8 | <1/8" |
| 70/30 | 7 | 5 | >55 | 1.0 | <1/8" |
| 65/35 | 7 | 7 | 45 | 1.0 | 1/8" |
| 60/40 | 8 | 9 | 10 | 1.3 | 1/8" |
| Sample 14/Sample 8-Blends of a Two-stage Latex and a Single Stage Latex | | | | | |
| 100/0* | 2 | 0 | >55 | 0.7 | <1/8" |
| 95/5 | 4 | 0 | >55 | 0.6 | <1/8" |
| 90/10 | 4 | 3 | >55 | 0.6 | <1/8" |
| 85/15 | 5 | 3 | 22 | 0.8 | <1/8" |
| 80/20 | 5 | 4 | 16 | 1.1 | <1/8" |
| 75/25 | 6 | 5 | 6 | 1.1 | <1/8" |
| 70/30 | 8 | 6 | 4 | 1.7 | 1/8" |
| 65/35 | 9 | 9 | <2 | 2.0 | 3/16" |
| 60/40 | 10 | 10 | <2 | 2.3 | 1/8" |
| Sample 16/Sample 8-Blends of a Two-stage Latex and a Single Stage Latex | | | | | |
| 100/0* | 3 | 4 | >55 | 1.4 | <1/8" |
| 95/5 | 5 | 4 | 18 | 1.4 | <1/8" |
| 90/10 | 6 | 4 | 8 | 1.5 | 1/8" |
| 85/15 | 8 | 6 | 2 | 1.9 | 1/8" |
| 80/20 | 9 | 8 | <2 | 2.0 | 1/8" |
| 75/25 | 10 | 9 | <2 | 2.5 | 1/4" |
| 70/30 | | | Did Not Form a Film | | |
| 65/35 | | | Did Not Form a Film | | |

TABLE 5-continued

| Blend Ratio | Block | Print | Reverse Impact (Inches/Pound) | Hardness (KHN) | Flexibility |
|---|---|---|---|---|---|
| 60/40 | | | Did Not Form a Film | | |

*Comparative

EXAMPLE 3

Properties of films derived from coalescent free blends, which include a 140 nanometer, two-stage latex blended with a second latex, at a particle size ratio of approximately 4:1.

Blends of samples 6, 9, 10 and 11 with sample 2 were prepared at polymer blend weight ratios of 100/0, 90/10, 80/20, 70/30 and 60/40. Sample 2 was the second latex in the blend and was single stage. Films were cast of each of the resultant emulsion polymer blends, and subjected to block, print and impact resistance tests, and the determination of film hardness and flexibility. Results are shown in Table 6.

For each series of blends, increasing concentrations of the second latex increased block and print resistance, and hardness. However, the improvements in these properties obtained for blends containing samples 9, 10, and 11 (all two-stage latexes) were superior to the properties that could be achieved by blending two single stage latexes (blends of samples 6 and 2).

Samples 6, 9, 10, and 11 were prepared with compositionally identical soft and hard stages, but differed in the relative quantities of hard stage from 0% to 40% of the total polymer weight. For example, Sample 6 is a single stage latex with 0% hard stage. Sample 9 is a two-stage latex which contains 25% hard stage; Sample 10 is a two-stage latex which contains 33% hard stage; Sample 11 is a two stage latex which contains 40% hard material. Increasing the amount of hard stage within the two-stage latex improved the response to the blending process of properties which are hardness dependent, such as block and print resistance and measured hardness. For example, a comparison of block resistance for blends made at a 75/25 polymer blend ratio showed an improvement from 5 to 8 to 8 to 9 in response to increases in the amount of hard stage in the two stage latex. Similar improvements in print resistance, from 2 to 6 to 7 to 8, and in hardness, from 0.5 to 1.5 to 2.2 to 3.6, were also observed for the 75/25 blends. In addition, these films retained significant toughness and flexibility over a broad compositional range.

This example showed that films with desired block resistance, print resistance, hardness, and flexibility can be prepared in the absence of coalescent by blending a 140 nm two stage latex with a second latex, at a particle size ratio of approximately 4:1.

TABLE 6

| Blend Ratio | Block | Print | Reverse Impact (Inches/Pound) | Hardness (KHN) | Mandrel Flexibility |
|---|---|---|---|---|---|
| Sample 6/Sample 2-Blends of Single Stage Latexes Comparative Data | | | | | |
| 100/0 | 0 | 0 | >55 | 0.4 | <1/8" |
| 95/5 | 0 | 0 | >55 | 0.3 | <1/8" |
| 90/10 | 1 | 0 | >55 | 0.3 | <1/8" |
| 85/15 | 2 | 1 | >55 | 0.4 | <1/8" |
| 80/20 | 4 | 2 | >55 | 0.5 | <1/8" |
| 75/25 | 5 | 2 | >55 | 0.5 | <1/8" |
| 70/30 | 6 | 3 | 54 | 0.9 | <1/8" |
| 65/35 | 8 | 4 | 52 | 1.2 | <1/8" |
| 60/40 | 9 | 5 | 52 | 1.4 | <1/8" |
| Sample 9/Sample 2-Blends of a Two-Stage Latex and a Second | | | | | |

TABLE 6-continued

| Blend Ratio | Block | Print | Reverse Impact (Inches/Pound) | Hardness (KHN) | Mandrel Flexibility |
|---|---|---|---|---|---|
| Latex | | | | | |
| 100/0* | 0 | 1 | >56 | 0.5 | <⅛" |
| 95/5 | 1 | 1 | 48 | 0.6 | <⅛" |
| 90/10 | 2 | 2 | 36 | 1.0 | <⅛" |
| 85/15 | 5 | 3 | 36 | 1.0 | <⅛" |
| 80/20 | 6 | 5 | 36 | 1.2 | <⅛" |
| 75/25 | 8 | 6 | 36 | 1.5 | <⅛" |
| 70/30 | 8 | 7 | 18 | 1.5 | ⅛" |
| 65/35 | 8 | 8 | 18 | 2.1 | ⅛" |
| 60/40 | 8 | 9 | 12 | 3.2 | ⅛" |
| Sample 10/Sample 2-Blends of a Two Stage Latex and a Second Latex | | | | | |
| 100/0* | 1 | 1 | 40 | 1.0 | <⅛" |
| 95/5 | 2 | 4 | 14 | 1.0 | <⅛" |
| 90/10 | 3 | 5 | 12 | 12 | <⅛" |
| 85/15 | 6 | 5 | 10 | — | <⅛" |
| 80/20 | 7 | 6 | 12 | 1.5 | <⅛" |
| 75/25 | 8 | 7 | 10 | 2.2 | <⅛" |
| 70/30 | 8 | 8 | 10 | 2.5 | ⅛" |
| 65/35 | 9 | 9 | 10 | 4.0 | ⅛" |
| 60/40 | 10 | 9 | 4 | 4.1 | 3/16" |
| Sample 11/Sample 2-Blends of a Two Stage Latex and a Second Latex | | | | | |
| 100/0* | 4 | 5 | 40 | 1.6 | <⅛" |
| 95/5 | 5 | 5 | 22 | 1.2 | <⅛" |
| 90/10 | 6 | 5 | 18 | 1.5 | <⅛" |
| 85/15 | 8 | 6 | 12 | 2.2 | <⅛" |
| 80/20 | 9 | 7 | 12 | 2.7 | <⅛" |
| 75/25 | 9 | 8 | 12 | 3.6 | ⅛" |
| 70/30 | 9 | 8 | 8 | 3.4 | ⅛" |
| 65/35 | | | Did Not Form Film | | |
| 60/40 | | | Did Not Form Film | | |

*Comparative

EXAMPLE 4

Properties of films derived from coalescent free blends, which include a 140 nanometer, two-stage latex and a second latex, at a particle size ratio of approximately 2:1.

Blends of Samples 6, 9, 10 and 11 with Sample 1 were prepared at polymer weight ratios of 100/0, 90/10, 80/20, 70/30 and 60/40. Sample 1 was the second latex in the blend and was single stage. Films were cast of each of the resultant emulsion polymer blends, and subjected to block, print and impact resistance tests, and the determination of film hardness and flexibility. Results are summarized in Table 7.

For each series of blends, increasing concentrations of the second latex increased block and print resistance, and hardness. However, the improvements in these properties obtained for blends containing samples 9, 10, and 11 (all two-stage latexes) were superior to the properties that could be achieved by blending two single stage latexes (blends of samples 6 and 1).

Samples 6, 9, 10, and 11 were prepared with compositionally identical soft and hard stages, but differed in the relative quantities of hard stage from 0% to 40% of the total polymer weight. For example, Sample 6 is a single stage latex with 0% hard stage. Sample 9 is a two-stage latex which contains 25% hard stage; Sample 10 is a two-stage latex which contains 33% hard stage; Sample 11 is a two stage latex which contains 40% hard stage. Increasing the amount of hard stage within the two-stage latex improved the response to the blending process of properties which are hardness dependent, such as block and print resistance and measured hardness. For example, a comparison of block resistance for blends made at a 75/25 polymer blend ratio showed an improvement from 4 to 8 to 8 to 9 in response to increases in the amount of hard stage in the two stage latex. Similar improvements in print resistance, from 2 to 4 to 6 to 8, and in hardness, from 0.5 to 1.1 to 1.8 to 2.8, were also observed for the 75/25 blends. In addition, these films retained significant toughness and flexibility over a broad compositional range.

This example demonstrates the desirable balance of film properties that can be obtained by blending a two stage latex with a second latex in the absence of added cosolvent, at a 2:1 particle size ratio.

TABLE 7

| Blend Ratio | Block | Print | Reverse Impact (Inches/Pound) | Hardness (KHN) | Mandrel Flexibility |
|---|---|---|---|---|---|
| Sample 6/Sample 1-Blends of Single Stage Latexes Comparative Data | | | | | |
| 100/0 | 0 | 0 | >55 | 0.4 | <⅛" |
| 95/5 | 1 | 0 | >55 | 0.5 | <⅛" |
| 90/10 | 1 | 0 | >55 | 0.4 | <⅛" |
| 85/15 | 2 | 1 | >55 | 0.3 | <⅛" |
| 80/20 | 2 | 2 | >55 | 0.4 | <⅛" |
| 75/25 | 4 | 2 | >55 | 0.5 | <⅛" |
| 70/30 | 5 | 3 | 54 | 0.6 | <⅛" |
| 65/35 | 6 | 4 | 58 | 0.7 | <⅛" |
| 60/40 | 8 | 4 | 48 | 0.9 | <⅛" |
| Sample 9/Sample 1-Blends of a Two-Stage Latex and a Second Latex | | | | | |
| 100/0* | 0 | 1 | >56 | 0.5 | <⅛" |
| 95/5 | 1 | 1 | >56 | 0.5 | <⅛" |
| 90/10 | 1 | 2 | >56 | 0.6 | <⅛" |
| 85/15 | 5 | 3 | >56 | 0.7 | <⅛" |
| 80/20 | 6 | 4 | 56 | 1.0 | <⅛" |
| 75/25 | 8 | 4 | 52 | 1.1 | <⅛" |
| 70/30 | 8 | 5 | 38 | 1.4 | <⅛" |
| 65/35 | 9 | 7 | 36 | 1.9 | ⅛" |
| 60/40 | 9 | 8 | 18 | 2.2 | ⅛" |
| Sample 10/Sample 1-Blends of a Two-Stage Latex and a Second Latex | | | | | |
| 100/0* | 1 | 1 | 40 | 1.0 | <⅛" |
| 95/5 | 1 | 2 | 32 | 1.0 | <⅛" |
| 90/10 | 3 | 3 | 30 | 1.2 | <⅛" |
| 85/15 | 5 | 4 | 14 | 1.1 | <⅛" |
| 80/20 | 6 | 5 | 14 | 1.4 | <⅛" |
| 75/25 | 8 | 6 | 12 | 1.8 | <⅛" |
| 70/30 | 9 | 7 | 10 | 2.1 | ⅛" |
| 65/35 | 9 | 8 | 8 | 2.6 | ⅛" |
| 60/40 | 9 | 9 | 2 | 3.4 | ⅛" |
| Sample 11/Sample 1-Blends of a Two-Stage Latex and a Second Latex | | | | | |
| 100/0* | 4 | 5 | 40 | 1.6 | <⅛" |
| 95/5 | 5 | 5 | 20 | 1.7 | <⅛" |
| 90/10 | 6 | 6 | 16 | 2.1 | <⅛" |
| 85/15 | 8 | 7 | 12 | 2.2 | <⅛" |
| 80/20 | 9 | 7 | 10 | 2.8 | <⅛" |
| 75/25 | 9 | 8 | 10 | 2.8 | ⅛" |
| 70/30 | 9 | 9 | 8 | 3.4 | ⅛" |
| 65/35 | | | Did Not Form Film | | |
| 60/40 | | | Did Not Form Film | | |

*Comparative

EXAMPLE 5

Properties of films derived from coalescent-free emulsion polymer blends which include a crosslinked two-stage latex and a second latex, at a particle size ratio of approximately 5:1.

Sample 20 is a two-stage latex with a crosslinked hard stage, and a soft stage, in which the hard stage is polymerized prior to the soft stage. Sample 8 is a single stage latex. Blends of samples 20 and 8 were prepared at polymer blend weight ratios of 100/0, 90/10, 80/20, 70/30 and 60/40. Films were cast of each of the resultant emulsion polymer blends, and subjected to block, print and impact resistance tests, and the determination of film hardness and flexibility. Results are summarized in Table 8.

Block, print and hardness data indicate a similar response to blending to what was observed in the previous examples. In particular, the addition of the second latex to the two-stage latex, at increasing concentrations greatly improved block and print resistance, and similarly increased film hardness. In addition, films retained significant toughness and flexibility over a broad compositional range.

This example demonstrates that a two-stage latex which has a hard, crosslinked stage polymerized prior to a soft stage, can be utilized for the multi-stage latex in the blends of this invention.

TABLE 8

Sample 20/Sample 8-Blends of a Two-Stage Crosslinked Latex and a Second Latex

| Blend Ratio | Block | Print | Reverse Impact (Inches/Pound) | Hardness (KHN) | Mandrel Flexibility |
|---|---|---|---|---|---|
| 100/0 | 0 | 3 | 50 | 1.4 | <1/8" |
| 95/5 | 6 | 3 | 30 | 2.1 | <1/8" |
| 90/10 | 8 | 4 | 10 | 3.6 | <1/8" |
| 85/15 | 7 | 4 | 6 | 2.1 | 1/8" |
| 80/20 | 7 | 6 | 0 | 2.1 | 3/8" |
| 75/25 | 8 | 7 | 0 | 4.1 | >1" |
| 70/30 | 6 | 8 | 0 | 3.9 | >1" |
| 65/35 | | | Did Not Form Film | | |
| 60/40 | | | Did Not Form Film | | |

EXAMPLE 6

Properties of films derived from coalesced emulsion polymer blends of a two-stage latex and a second latex, at a particle size ratio of approximately 5:1.

Samples 17, 18, and 19 are two-stage latexes with 40% by weight hard stage and 60% by weight soft stage. Sample 8 is the second latex in the blend and is single stage. Blends of samples 17, 18 and 19 with sample 8 were prepared at polymer blend weight ratios of 100/0, 90/10, 80/20, 70/30 and 60/40. A sufficient quantity of propylene glycol phenyl ether was added to the resultant blends in order to obtain adequate film formation under ambient conditions. Films were prepared from each of the resultant emulsion polymer blends, and subjected to an impact resistance test, and the determination of film hardness and flexibility. Results are summarized in Table 9.

Samples 17, 18, and 19 were prepared with compositionally identical hard stages; the glass transition temperature, Tg, of the soft stages were varied from −11° C., to 3° C., and 18° C., respectively. Increasing the Tg of the soft stage of the two stage latexes in the emulsion polymer blends improved film hardness. Furthermore, increasing the amount of the second latex added to the two stage latex, significantly increased the hardness of films prepared from the resulting blend. As the second latex (sample 8) concentration was raised from 0 to 30 percent in blends with sample 17 the film hardness increased from 2.2 to 9.5. Similar responses were observed for blends containing samples 18 and 19. In addition, the films remained both tough and flexible over much of the concentration range.

TABLE 9

Blends of a Two Stage Latex and a Second Latex

| Blend Ratio | Hardness (KHN) | Reverse Impact (Inches/Pound) | Mandrel Flexibility |
|---|---|---|---|

Sample 17/Sample 8 (With 15% Propylene Glycol Phenyl Ether based on the total weight solids of Sample 17 in the Blend)

TABLE 9-continued

Blends of a Two Stage Latex and a Second Latex

| Blend Ratio | Hardness (KHN) | Reverse Impact (Inches/Pound) | Mandrel Flexibility |
|---|---|---|---|
| 100/0* | 2.2 | 60 | <1/8" |
| 95/5 | 2.9 | 16 | <1/8" |
| 90/10 | 3.3 | 14 | <1/8" |
| 85/15 | 3.6 | 12 | <1/8" |
| 80/20 | 5.6 | <2 | 1/8" |
| 75/25 | 6.0 | <2 | 1/8" |
| 70/30 | 9.5 | <2 | >1" |
| 65/35 | Did Not Form a Film | | |
| 60/40 | Did Not Form a Film | | |

Sample 18/Sample 8 (With 20% Propylene Glycol Phenyl Ether based on the total weight solds of Example 18 in the Blend)

| 100/0* | 2.3 | 52 | <1/8" |
| 95/5 | 4.3 | 2 | <1/8" |
| 90/10 | 5.4 | <2 | <1/8" |
| 85/15 | 5.4 | <2 | 1/8" |
| 80/20 | 4.7 | <2 | 1/8" |
| 75/25 | 7.7 | <2 | 1" |
| 70/30 | — | <2 | >1" |
| 65/35 | 6.1 | <2 | >1" |
| 60/40 | Did Not Form a Film | | |

Sample 19/Sample 8 (With 25% Propylene Glycol Phenyl Ether based on the total weight solids of Sample 19 in the Blend)

| 100/0* | 3.5 | 36 | <1/8" |
| 95/5 | 1.9 | <2 | <1/8" |
| 90/10 | 2.7 | <2 | <1/8" |
| 85/15 | 3.7 | <2 | <1/8" |
| 80/20 | 5.2 | <2 | 1" |
| 75/25 | 8.7 | <2 | 1" |
| 70/30 | 6.7 | <2 | >1" |
| 65/35 | 5.9 | <2 | >1" |
| 60/40 | 9.8 | <2 | >1" |

*Comparative

EXAMPLE 7

Effect of annealing on films derived from coalescent free blends.

Blends of samples 7, 14 and 16 with sample 8 were prepared at polymer weight ratios of 100/0, 90/10, 80/20, 70/30 and 60/40. Samples 7 and 8 were single stage latexes and Samples 14 and 16 were two stage latexes. Films were prepared from each of the resultant emulsion polymer blends, and then placed into a 350° F. oven for 30 minutes. These samples were then subjected to block, print and impact resistance tests, and the determination of film hardness and flexibility. Results are summarized in Table 10.

Comparison of the results presented in Table 10 with those in Table 5 reveal that heat treatment of the blend derived films improved film flexibility for all samples. Furthermore, there was significant improvement in film hardness achieved as a result of the annealing process. For example, the 65/35 blend of samples 14 and 8 prior to heat treatment exhibited a hardness of 2.0, a reverse impact strength below 2 inch pounds, and passed a 3/16 inch mandrel. After baking, these values improved to 5.5, 55 inch pounds and greater than 1/8 inch, respectively. Numerous examples of such property enhancements may be obtained by comparison of Tables 5 and 10.

TABLE 10

| Blend Ratio | Block | Print | Reverse Impact (Inches/Pound) | Hardness (KHN) | Mandrel Flexibility |
|---|---|---|---|---|---|
| Sample 7/Sample 8-Blends of Single Stage Latexes Comparative Data | | | | | |
| 100/0 | 0 | 0 | 52 | | <1/8" |
| 95/5 | 0 | 0 | 52 | | <1/8" |
| 90/10 | 0 | 1 | 52 | 0.4 | <1/8" |

TABLE 10-continued

| Blend Ratio | Block | Print | Reverse Impact (Inches/Pound) | Hardness (KHN) | Mandrel Flexibility |
|---|---|---|---|---|---|
| 85/15 | 0 | 5 | 50 | 0.7 | <1/8" |
| 80/20 | 0 | 8 | 50 | 1.0 | <1/8" |
| 75/25 | 4 | 8 | 50 | 1.4 | <1/8" |
| 70/30 | 9 | 9 | 50 | 1.8 | <1/8" |
| 65/35 | 10 | 9 | 50 | 2.3 | <1/8" |
| 60/40 | 10 | 10 | 48 | 3.9 | <1/8" |

Sample 14/Sample 8-Blends of a Two Stage Latex and a Single Stage Latex

| | | | | | |
|---|---|---|---|---|---|
| 100/0* | 0 | 1 | 55 | 0.4 | <1/8" |
| 95/5 | 0 | 2 | 55 | 0.7 | <1/8" |
| 90/10 | 4 | 3 | 55 | 1.0 | <1/8" |
| 85/15 | 4 | 3 | 55 | 1.7 | <1/8" |
| 80/20 | 9 | 9 | 55 | 2.4 | <1/8" |
| 75/25 | 9 | 9 | 55 | 2.7 | <1/8" |
| 70/30 | 9 | 9 | 55 | 3.8 | <1/8" |
| 65/35 | 10 | 10 | 55 | 5.5 | <1/8" |
| 60/40 | | | Did Not Form Film | | |

Sample 16/Sample 8-Blends of a Two Stage Latex and a Single Stage Latex

| | | | | | |
|---|---|---|---|---|---|
| 100/0* | 8 | 9 | 55 | 1.9 | <1/8" |
| 95/5 | 8 | 9 | 55 | 2.4 | <1/8" |
| 90/10 | 9 | 9 | 55 | 2.5 | <1/8" |
| 85/15 | 9 | 9 | 55 | 3.4 | <1/8" |
| 80/20 | 10 | 10 | 55 | 4.4 | <1/8" |
| 75/25 | | | Did Not Form a Film | | |
| 70/30 | | | Did Not Form a Film | | |
| 65/35 | | | Did Not Form a Film | | |
| 60/40 | | | Did Not Form a Film | | |

*Comparative

EXAMPLE 8

Effect of baking temperature on annealed film properties

In order to demonstrate the effect of temperature of bake on the properties of baked, coalescent-free films, a series of samples were heated for two minutes at temperatures ranging from below to above that equal to the Tg of both the hard stage in the two-stage latex and the second latex. Samples in which the molecular weight of both the hard stage in the two-stage latex and the second latex were reduced have been included.

Blends of samples 10 and 3, 12 and 4, and 13 and 5 were prepared at polymer blend weight ratios of 85/15, 75/25 and 65/35. Samples 10, 12 and 13 were prepared by a multi-stage process with identical compositions, except for the inclusion of increasing levels of chain transfer agent in the hard stage. Samples 3, 4 and 5 were prepared by a single-stage process with identical compositions, except for the inclusion of increasing levels of chain transfer agent. The composition and level of chain transfer agent in the hard stages of samples 10, 12 and 13 were identical to those in samples 3, 4 and 5. Films were prepared from the emulsion polymer blends and subjected to a bake cycle for a period of 2 minutes at temperatures from 160° F. to 250° F.

As can be seen from Table 11, films obtained from blends of samples 10 and 3, 12 and 4, and 13 and 5 all evidence improvements in both hardness and flexibility as the bake temperature approaches and exceeds the glass transition temperature of both the hard stage in the two-stage latex and the second latex. The temperature at which this occurs decreases with the incorporation of increasing levels of chain transfer agent, and was found to be about 225° F. for blends of samples 10 and 3, about 200° F. for blends of samples 12 and 4, and about 185° F. for blends of samples 13 and 5.

Increasing the level of the second latex in the emulsion polymer blends, as was demonstrated in examples 2 through 5, resulted in increased hardness of unbaked films. The baked films also had improved hardness with increased levels of the second latex in the emulsion polymer blends, without loss of flexibility. The present example demonstrates both the moderate temperature and short bake cycle necessary to achieve a desirable balance of film hardness and flexibility properties.

TABLE 11

Blends of a Two Stage Latex and a Second Latex

Sample 10/Sample 3

| | Blend Ratio | | | |
|---|---|---|---|---|
| | 85/15 | | 65/35 | |
| Temperature (°F.) | Hardness (KHN) | Reverse Impact (Inches/Pound) | Hardness (KHN) | Reverse Impact (Inches/Pound) |
| Unbaked | 1.0 | 12 | 1.9 | 0 |
| 160 | 0.7 | 56 | 2.1 | 0 |
| 185 | 1.0 | 60 | 2.2 | 2 |
| 200 | 1.2 | 60 | 2.8 | 2 |
| 225 | 1.3 | 60 | 4.0 | 20 |
| 250 | 1.4 | 60 | 3.0 | 44 |

Sample 12/Sample 4

| | Blend Ratio | | | | | |
|---|---|---|---|---|---|---|
| | 85/15 | | 75/25 | | 65/35 | |
| Temperature (°F.) | Hardness | Reverse Impact | Hardness | Reverse Impact | Hardness | Reverse Impact |
| Unbaked | 0.9 | 60 | 1.4 | 16 | 2.2 | 0 |
| 160 | 1.2 | 60 | 1.8 | 16 | 2.9 | 0 |
| 185 | 1.3 | 60 | 2.1 | 40 | 2.8 | 4 |
| 200 | 1.5 | 60 | 2.2 | 48 | 3.1 | 10 |
| 225 | 1.7 | 60 | 2.7 | 60 | 4.2 | 36 |
| 250 | 2.3 | 60 | 2.9 | 60 | 4.3 | 60 |

Sample 13/Sample 5

| | Blend Ratio | | | | | |
|---|---|---|---|---|---|---|
| | 85/15 | | 75/25 | | 65/35 | |
| Temperature (°F.) | Hardness (KHN) | Reverse Impact (Inches/Pound) | Hardness (KHN) | Reverse Impact (Inches/Pound) | Hardness (KHN) | Reverse Impact (Inches/Pound) |
| Unbaked | 1.1 | 60 | 1.6 | 48 | 2.6 | 4 |
| 160 | 1.2 | 60 | 1.7 | 60 | 2.9 | 4 |
| 185 | 1.3 | 60 | 2.3 | 60 | 3.4 | 12 |
| 200 | 1.5 | 60 | 2.7 | 60 | 4.0 | 16 |
| 225 | 1.9 | 60 | 3.1 | 60 | 4.6 | 60 |
| 250 | 2.4 | 60 | 3.4 | 60 | 5.2 | 60 |

EXAMPLE 9

Properties of a coalescent-free paint

The present example demonstrates that blends of a two-stage latex with a second latex can be formulated into coalescent-free paints with desirable block resistance and print resistance. Paints were formulated as shown in Table 12 using various blends of samples 14 and 1 (particle size ratio of approximately 5:1). The properties of the resultant systems are summarized in Table 13. Increasing the concentration of sample 1 in the blend led to improvements in block and print resistance.

TABLE 12

| Paint Formulation | | |
|---|---|---|
| Material | Material Type | Grams |
| Anionic Polyelectrolyte (50% in water) | Dispersant | 4.9 |
| Alkylaryl Polyether | Surfactant | 2.2 |
| Rutile Titanium Dioxide | Pigment | 200 |
| Water | | 57.2 |

TABLE 12-continued

Paint Formulation

| Material | Material Type | Grams |
| --- | --- | --- |
| Sample 14/Sample 1 (37% by weight solids) | Polymer Blend | 630.4 |
| Polyurethane Resin (20% in water) | Thickener | 46.3 |
| Total | | 941.0 |

Pigment Volume Concentration = 18%
Volume Solids = 37.4%

TABLE 13

Properties of a Coalescent-Free Paint
Sample 14/Sample 1-Paints made with Blends of a Two Stage Latex and a Second Latex

| Blend Ratio | Block Resistance | Print Resistance |
| --- | --- | --- |
| 100/0* | 0 | 3 |
| 90/10 | 0 | 3 |
| 80/20 | 2 | 5 |
| 70/30 | 6 | 8 |

*Comparative

I claim:

1. An emulsion polymer blend comprising from about 95 to about 40 percent by weight of at least one first latex and from about 5 to about 60 percent by weight of at least one second latex, wherein the first latex is multi-stage comprising from about 95 to about 50 percent by weight of at least one soft stage polymer having a Tg less than 50° C. and from about 5 to about 50 percent by weight of at least one hard stage polymer having a Tg from about 20° C. to about 160° C., wherein the Tg of the soft stage polymer is lower than the Tg of the hard stage polymer, and wherein the second latex does not form a film at ambient temperature.

2. An aqueous coating composition comprising from about 30 to 100 percent by volume of the emulsion polymer blend of claim 1.

3. The emulsion polymer blend of claim 1 where the relative particle size ratio of the first latex to the second latex is from about 1:1 to about 20:1.

4. The emulsion polymer blend of claim 1 where the relative particle size ratio of the first latex to the second latex is from about 2:1 to about 10:1.

5. The emulsion polymer blend of claim 1 where the blend contains from 80 to 50 percent by weight of the first latex and from 20 to 50 percent by weight of the second latex.

6. The emulsion polymer blend of claim 1 where the blend contains from 90 to 60 percent by weight of the first latex and from 10 to 40 percent by weight of the second latex.

7. The emulsion polymer blend of claim 1 where the Tg of the second latex is from about 20° C. to about 160° C.

8. The emulsion polymer blend of claim 7 where the Tg of the second latex is from about 40° C. to about 100° C.

9. The emulsion polymer blend of claim 1 where the first latex comprises from about 95 to 55 percent by weight of at least one soft stage polymer having a Tg less than about 20° C. and from about 5 to 45 percent by weight of at least one hard stage polymer having a Tg greater than about 20° C.

10. The emulsion polymer blend of claim 1 where the first latex comprises from 75 to 60 percent by weight of at least one soft stage polymer having a Tg less than about 10° C. and from about 25 to 40 percent by weight of at least one hard stage polymer having a Tg greater than about 20° C.

11. The aqueous coating composition of claim 2 wherein the composition is a paint.

12. The aqueous coating composition of claim 2 wherein the composition is a caulk.

13. The aqueous coating composition of claim 2 wherein the composition is a clear coating for wood.

14. The aqueous coating composition of claim 2 wherein the composition is an ink.

15. the aqueous coating composition of claim 2 wherein the composition is a paper coating.

16. The aqueous coating composition of claim 2 wherein the composition is a floor polish.

17. The aqueous coating composition of claim 2 wherein the composition is a concrete sealer.

18. The aqueous coating composition of claim 2 wherein the composition is a mastic.

19. The aqueous coating composition of claim 2 wherein the composition is a varnish.

20. The emulsion polymer blend of claim 1 where the weight average molecular weight of the hard stage of the multi-stage latex is greater than 5,000.

21. The emulsion polymer blend of claim 1 where the weight average molecular weight of the hard stage of the multi-stage latex is greater than 50,000.

22. The emulsion polymer blend of claim 1 where the weight average molecular weight of the second latex is greater than 5,000.

23. The emulsion polymer blend of claim 1 where the weight average molecular weight of the second latex is greater than 50,000.

24. The aqueous coating composition of claim 2 where the composition is coalescent-free.

* * * * *